United States Patent
Carlson et al.

(10) Patent No.: US 7,315,855 B2
(45) Date of Patent: Jan. 1, 2008

(54) METHOD FOR EFFICIENT PROCESSING OF MULTI-STATE ATTRIBUTES

(75) Inventors: David Glenn Carlson, Rochester, MN (US); Kevin James Kathmann, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/127,647

(22) Filed: May 12, 2005

(65) Prior Publication Data
US 2005/0278316 A1 Dec. 15, 2005

Related U.S. Application Data

(62) Division of application No. 10/164,767, filed on Jun. 7, 2002, now Pat. No. 7,089,230.

(51) Int. Cl.
*G06F 17/30* (2006.01)

(52) U.S. Cl. .................. 707/3; 707/2; 707/4; 707/101; 707/102

(58) Field of Classification Search .................... 707/2, 707/3, 4, 8, 10, 100, 103 R, 200, 101, 102; 717/109; 709/201, 208
See application file for complete search history.

(56) References Cited

U.S. PATENT DOCUMENTS

| | | | | |
|---|---|---|---|---|
| 4,829,427 A | * | 5/1989 | Green | 707/4 |
| 4,918,593 A | * | 4/1990 | Huber | 707/200 |
| 4,956,774 A | * | 9/1990 | Shibamiya et al. | 707/2 |
| 5,276,870 A | * | 1/1994 | Shan et al. | 707/2 |
| 5,412,804 A | * | 5/1995 | Krishna | 707/2 |
| 5,956,718 A | * | 9/1999 | Prasad et al. | 707/10 |
| 6,064,816 A | * | 5/2000 | Parthasarathy et al. | 717/109 |
| 6,263,328 B1 | * | 7/2001 | Coden et al. | 707/3 |
| 6,289,334 B1 | * | 9/2001 | Reiner et al. | 707/3 |
| 6,314,430 B1 | * | 11/2001 | Chang | 707/103 R |
| 6,321,374 B1 | * | 11/2001 | Choy | 707/2 |
| 6,910,032 B2 | * | 6/2005 | Carlson et al. | 707/3 |
| 6,915,291 B2 | * | 7/2005 | Carlson et al. | 707/2 |
| 7,117,231 B2 | * | 10/2006 | Fischer et al. | 707/203 |
| 7,206,789 B2 | * | 4/2007 | Hurmiz et al. | 707/102 |
| 7,213,026 B2 | * | 5/2007 | Evans et al. | 707/101 |
| 2002/0035559 A1 | * | 3/2002 | Crowe et al. | 707/2 |
| 2003/0187858 A1 | * | 10/2003 | Kirk et al. | 707/100 |
| 2003/0208489 A1 | * | 11/2003 | Todd | 707/8 |
| 2003/0229621 A1 | * | 12/2003 | Carlson et al. | 707/2 |
| 2003/0229639 A1 | * | 12/2003 | Carlson et al. | 707/100 |

OTHER PUBLICATIONS

G. Mitchell, "Extensible Query Processing in an Object-Oriented Database," May 1993, Thesis, Department of Computer Science, Brown University, pp. 1-166. □□.*

* cited by examiner

*Primary Examiner*—Shahid A Alam
(74) *Attorney, Agent, or Firm*—Patterson & Sheridan, LLP

(57) ABSTRACT

Methods, systems and articles of manufacture of processing a multi-state attribute field query. One embodiment provides a method of processing a multi-state attribute field query, comprising instantiating a plurality of live objects; performing, by each live object, an attribute operation, wherein at least one attribute operation is a comparison operation associated with attributes of the query. The plurality of live objects access a global status storage area only when an operand of the comparison operation is null or error. In any case, execution control is passed from each live object to an adjacent live object.

16 Claims, 10 Drawing Sheets

METHOD FOR EFFICIENT PROCESSING OF MULTI-STATE ATTRIBUTES

CROSS-REFERENCE TO RELATED APPLICATIONS

This application is a divisional of U.S. patent application Ser. No. 10/164,767, filed Jun. 7, 2002 now U.S. Pat. No. 7,089,230 entitled "METHOD FOR EFFICIENT PROCESSING OF MULTI-STATE ATTRIBUTES", which is herein incorporated by reference.

BACKGROUND OF THE INVENTION

1. Field of the Invention

The present invention relates to the field of data processing. More particularly, the present invention relates to a method, system and article of manufacture for processing queries on database record multi-state fields.

2. Background

A database is an organized collection of data records that can be readily searched, sorted and updated. The database is often logically arranged as tables identified by table names, with columns identified by column names and rows of records. Access to the database is typically managed by a software application known as a database management system (DBMS). RDBMS are a particular type of database management system (DBMS) applying a tuple and field architecture and have grown to be the dominant form of DBMS.

Before the advent of networks, RDBMS were employed on standalone computers, providing limited location service of data needs. However, RDBMS applications have continued to grow with and on the different hardware and network architectures to provide the organization of data, storage, updating, programmed and on demand retrieval of requested information based on the data in storage. For example, in a distributed computing environment, an application running on a first computer may require access to a database residing on a second computer. The computers each include some form of memory and a processor for the storage and execution of instructions, but they are also interconnected through communications equipment to collectively form a computer network so that they may share information. A three-tier model for database access is a common computer network architecture. As the name implies, the three-tier model includes three layers of processing, namely (1) a client, (2) a server and (3) a database server. A person, using a client application program that needs to access a database, will be using the client. For example, the client application may be an Internet browser and the database may be a directory of an Internet search engine. The client host communicates a request to the server host. The request typically includes a uniform resource locator (URL) that identifies the server host, the communications protocol, and the desired resource. The server determines the location of the database and establishes a connection to the database host, to include any handshaking necessary to secure the connection. Thereafter, the server machine relays the request to the database server. The request is managed by a DBMS also located on the database server. The requested data is transmitted from the database host to the server host, and it is thereafter relayed to the client where it is used by the client application program.

Computer communication occurs over one or more of the seven network layers provided using many public and proprietary protocols. A common method to exploit RDBMS applications evolved in the form of a $4^{th}$ Generation Language (4GL) called Structured Query Language (SQL). RDBMS application level requests and responses are submitted in SQL format syntax, usually at the application layer. The functions provided by a RDBMS are driven partly by user commands sent to it in SQL. SQL is not itself a DBMS nor a stand-alone product, but an integral product of an RDBMS which facilitates communication with the DBMS. Structured query language is also a standard protocol for accessing databases and records. SQL can be used to formulate a database interface statement for subsequently executing a database transaction. SQL includes features that allow users to query, update, insert data into, and delete data from, a database. User requests to a DBMS are made in the form of an SQL command or statement.

SQL is not a "complete" computer language in that is does not have a complete complement of constructs normally attributed to a computer language. Inside the RDBMS application, SQL commands are generally parsed and translated into intermediate languages, which can then embed and expand requests/commands in a language less user friendly but richer in lower or system level constructs. Moreover, the intermediate language can differ with implementation without changes to the SQL.

Because databases can be extremely large containing millions of records and more, even one SQL command requesting a result set can produce an operation requirement in the RDBMS that includes the access, retrieval, manipulation or storage of many millions of records. Accordingly, even small changes which reduce the time of an operational step repetitively employed over millions of times in the overall process of obtaining results can significantly affect the performance of an RDBMS and consequently user response time. Response time is a function of the RDBMS internal tasks of parsing, interpreting, searching, finding, retrieving, calculating, formulating and returning results. These programming tasks are typically accomplished in high level programming languages such as C, C++, JAVA and others. Any of these tasks may use common routines in these languages, which can strategically be made more efficient through algorithmic streamlining. These incremental efficiencies, even when conceptually or programmatically small, can have significant impacts on overall RDBMS performance.

The SQL statement can have four basic root "data manipulation language" commands (SELECT, UPDATE, INSERT, and DELETE)) with a myriad of qualifiers also called clauses, aggregates and logic. These produce expressions, which allow users to define what information in the database is to be accessed and how the access or results are to be viewed. SQL expressions can be arbitrarily complex and various. The software implementing the SQL parser and downstream programmable source code must be able to dynamically interpret and execute the query. This is typically done by a compiled program parsing the SQL expression and encoding this expression into an intermediate language instruction stream. However, the bookkeeping involved with this implementation can be substantial and ways to improve performance at any of these levels are needed. Such bookkeeping may include identifying tokens, buffering of temporary variables and data, function call ordering and placing or program stack, instantiating objects for intermediate component operations, executing stack operations, keeping track of relationships between intermediate components and operations, executing the intermediate operations and applying the requested logical operations, etc.

The four basic SQL commands use clauses and qualifiers to filter out record or rows from a query and include only those wanted in the query results. For example, an SQL WHERE clause is used to specify in more detail those records of interest. The following are illustrative SQL statements using a SELECT command with a WHERE clause:

SELECT city, sales, target FROM offices WHERE sales>target;

SELECT name, sales, quota FROM salesreps WHERE empl_num=100;

City, sales, target, name, quota and empl_num are typically associated with fields or attributes in a database table. Thus, a query with fields which can have different values or attributes is called a multi-state variable query. Offices and salesreps are tables in a database. Even one SQL statement can have many logical comparisons, range tests, membership tests and pattern matching, relationship tests and/or arithmetic tests. From these simple SELECT statements, it is clear that this process can be a significant task when multiplied over millions of records.

WHERE clauses as well as other SQL constructs, can have many field comparisons, logical operations, range tests, membership tests, pattern matches and arithmetic operations. These may have to be done repeatedly for many records. Some of these records may have a null field (missing data) or one that can give the SQL statement cause to return an error due to anomalous data such as data causing a divide by zero or out of range error. This can occur at anytime and wastes previous work done by not processing the remaining records or otherwise intelligently handling the nullity or error. Therefore, ways are needed to transform nulls and errors produced by field variables to manageable True/False logic without impairing the process progress or process integrity.

User SQL commands, statements, requests or clauses are parsed and processed by computer programs built from software applications running on various computers and computer systems. Although built to handle the SQL statements for a particular common industry standard syntax and grammar, software applications are uniquely architectured from a programming standpoint to achieve different goals and to comply with different programming philosophies and methodologies. Many SQL parsers use the interpretive method of accepting and processing SQL statements sequentially. Using the interpretive method, each statement is completely translated and executed before the next statement without building an object file and executable program.

One problem with the foregoing approach is the resulting substantial bookkeeping overhead required for such an implementation. Once the instruction stream is generated, much of the program logic is structured and an interpretation phase is setup to respond along prescribed paths. For example, when encountering Boolean logical operators such as AND and OR the execution logic may be set to only handle True and False. The generated instruction stream poses limitations to implementations which force a less than optimal approach when encountering nulls or errors. These approach limitations dictate function calls, returns and return handling, temporary buffers, larger working sets etc. What is needed is a more streamlined implementation of this process which reduces function calls, stack space use, cycle time, returned call handling, path length and all around working set size while operating under the dynamic input response requirements of the application.

SUMMARY OF THE INVENTION

Aspects of the invention provide methods, systems and articles of manufacture for processing a multi-state attribute field query. One embodiment provides a method of processing a multi-state attribute field query, comprising instantiating a plurality of live objects; and performing, by each live object, an attribute operation, wherein at least one attribute operation is a comparison operation associated with attributes of the query. The plurality of live objects access a global status storage area only when an operand of the comparison operation is null or error. In any case, execution control is passed from each live object to an adjacent live object.

In another embodiment, a method of processing a multi-state attribute field query comprises the steps of instantiating a plurality of live objects which perform attribute operations on attributes of the query. Comparison operations are streamlined by de-referencing associated attribute operands and loading the attribute operands into registers without an intermediate step of placing the operands into a structure for further manipulation. In one embodiment, each comparison operation comprises a logic value and sub-tree height count allowing a previous comparison operation of the query to track a number of statuses in a global status storage area (e.g., a stack) to be evaluated. The plurality of live objects access the global status storage area only when an operand of the comparison operation is null or error. The live objects pass execution control to an adjacent live object until query completion.

In still another embodiment, a method is provided for processing a multi-state attribute field query, comprising instantiating a plurality of live objects, and performing, by at least a portion of the live objects, comparison operations comprising operands associated with attributes of the query; wherein each comparison operation is performed by de-referencing associated attribute operands and loading the associated attribute operands into registers without an intermediate step of placing the operands into an intermediate structure for further manipulation. If the comparison operation operands are valid, execution control is passed from each live object to an adjacent live object, via a TRUE or FALSE, without accessing a stack.

Yet another embodiment provides for structuring of states from a group comprising true, false, null, and error as intermediate multi-state operator input state results and using non-outcome determinative input-output logic operator properties to structure execution flow to circumvent unproductive branches. As a result, intermediate results from the group of true and false can be obtained without interrupting execution (e.g., through error handlers). The null and error intermediate multi-state operator state results on the non-outcome determinative input-output logic operator properties are pruned out rendering them ineffective in producing query results.

Further aspects of the invention provide for computer readable medium containing a program which, when executed, performs any of the methods for processing a multi-state attribute field query stated above.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DESCRIPTION OF THE EMBODIMENT

Figure 1:
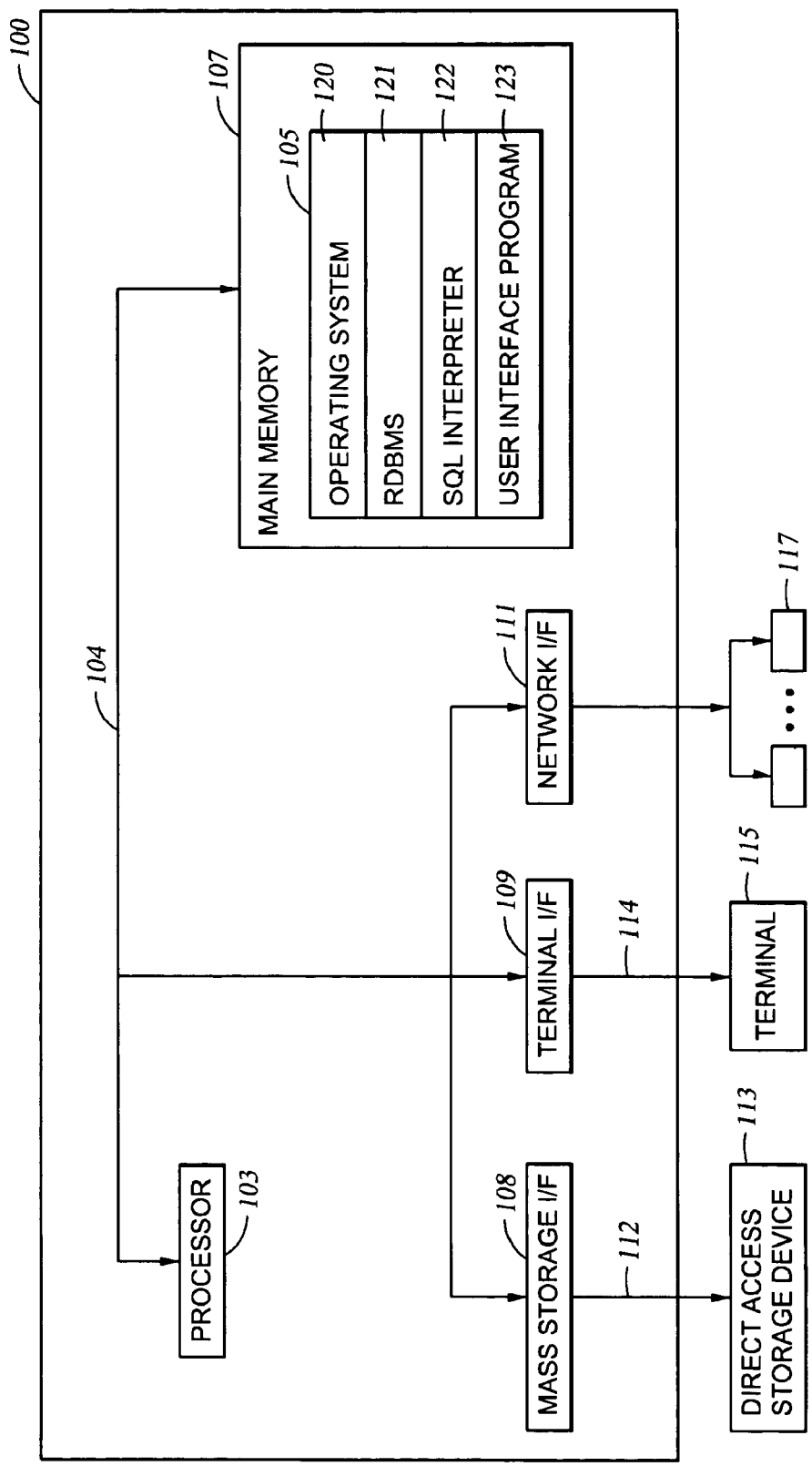
FIG. 1 shows a simple high level hardware architecture, which hosts software aspects of the present invention.

For purposes of illustration, embodiments of the invention are provided in the context of an RDBMS and its requirements. Various modifications to the preferred embodiment will be readily apparent to those skilled in the art, and the general principles defined herein may be applied to other embodiments and applications without departing from the spirit an scope of the invention. Thus, the present invention is not intended to be limited to the embodiment shown, but is to be accorded the widest scope consistent with the principles and features disclosed herein.

In general, embodiments of the invention relate to methods, systems and articles of manufacture for efficiently evaluating queries with multi-state variables. Some embodiments of the invention intelligently handle error and null statuses encountered while processing queries with multi-state attributes bundled with arithmetic and logic operations. Attribute descriptor vector and Attribute operation data structures are introduced to allow for an object oriented approach to advantageously carry out the individual attribute comparisons and manipulations involving the related multi-state attributes. The attribute data structures are instantiated into live objects. In one embodiment, these objects are processed using call foliation to thread execution through individual attribute operations in an optimal fashion. The execution path encounters true, false, null and errors states, which are handled responsive to the type of attribute logic demanded. The intelligent handling of the error and null states is done with logic means which takes advantage of the Boolean logic outcomes of certain logical operations such as ANDs and ORs to accomplish a mapping from query execution flow inhibiting null and error statuses to query execution flow enabling true false statuses where mathematically correct and without needless call returns. Thus, a multi-state attribute operation query evaluation can be completed by advantageously channeling call thread of execution in the event of error or null component attribute operation results. This process coupled with the organization of the attributes and attribute operations yields higher abstraction level tree-like structures that enable the dynamic processing of queries without losing the flexibility of an interpreter application.

While the embodiments hereinafter will be described in the context of fully functioning database management systems running on computers and computer systems, those skilled in the art will appreciate that the various embodiments of the invention are capable of being distributed as a program product in a variety of applications, and that embodiments of the invention apply equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROMs, DVDs, etc.), and transmission type media such as digital and analog communication links. Transmission type media include information conveyed to a computer by a communications medium, such as through a computer or telephone network, and include wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be implemented as part of an operating system or a specific application, component, program, object, module or sequence of instructions and may be referred to herein as a "components" or "objects", such as "component X" or "object Y". Software components and objects typically comprise one or more instructions that are resident at various times in various memory and storage devices in a computer, and that, when read and executed by one or more processors in a computer, cause that computer to perform the steps necessary to execute steps or elements embodying the various aspects of the invention. In addition, various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Hardware Context

FIG. 1 is a diagram showing a computer system 100, which can host a program in which embodiments of the invention can be applied. In one embodiment, the computer system 100 is an eServer iSeries computer from International Business Machines, Incorporated (IBM) of Armonk, N.Y. Computer system 100 includes at least one processor 103, which obtains instructions and data via a bus 104 from a main memory 107. Illustratively, the processor is a PowerPC available from IBM. More generally, however, any processor configured to implement the methods of the present invention may be used to advantage. The main memory 107 could be one or a combination of memory devices, including Random Access Memory, nonvolatile or backup memory, (e.g., programmable or Flash memories, read-only memories, etc.) and the like. In addition, memory 107 may be considered to include memory physically located elsewhere in a computer system 100, for example, any storage capacity used as virtual memory or stored on a mass storage device or on another computer coupled to the computer system 100 via bus 104. Illustratively, the main memory 107 contains executable programs 105 which manage the hardware and control the software programs 105. The Operating System 120 is a system of programs which manages the hardware and software resources for the use of application programs. The memory 107 further contains a Database Management System 121 (specifically, a RDBMS). In one embodiment, the RDBMS 121 is a DB2 application. Since the DB2 application has been ported to almost all platforms and operating systems currently in use in the market place, these can all eventually benefit from aspects of the present invention and server to broaden the scope of the invention. An SQL front end program 122 to the RDBMS 121 would typically also be resident in main memory 107 along with other programs 123 which can be paged or swapped in from other memory sources, local or networked. Software components and objects are but parts of programs which living together in various regions of addressable memory are executed to produce the necessary application functions. Software components and objects themselves can be broken down into data structures and programming logic which use the data structures.

The computer system 100 includes a number of operators and peripheral systems. Illustratively, these include a mass storage interface 108 operably connected to a direct access storage device 113, a input/output (I/O) interface 109 operably connected to I/O devices 115, and a network interface 111 operably connected to a plurality of networked devices 117. The I/O devices may include any combination of displays, keyboards, track point devices, mouse devices, speech recognition devices and the like. In some embodiments, the I/O devices are integrated, such as in the case of a touch screen. The networked devices 117 could be displays, desktop or PC-based computers, workstations, or network terminals, or other networked computer systems. As such, aspects of the invention can be practiced on a single computer system as well as over a network of computer systems.

Software Context

In a particular embodiment, the software component for more efficiently processing multi-state attribute variables (also referred to herein as multi-state attributes and multi-state variables) is implemented as a C++ program. However, the particular program language is not germane to embodiments of the invention and is therefore not considered limiting. Other embodiments are implemented using languages such as Java, Object Pascal, Smalltalk, Pascal, C, Basic, COBOL and the like.

As an object-oriented programming language, C++ includes the constructs of class, object, member variables and methods. A class is a template for defining the characteristics of a specific set of data structures and routines. The variables and routines defined by the class are respectively known as member variables and methods. When a program wishes to use those specific data structures and routines, the program instantiates the class, thus creating an object of the class. Object-oriented languages offer class inheritance and rules associated with their construction and use. They also offer the basic arithmetic, logic and control structures which channel and control variables, data structures and objects. These live in various areas of memory or registers, some of which are defined and controlled by the application program and some by the host operating system. All these language constructs can be used to advantage to create programs, which perform desired functions.

Live Objects

Generally, an object is created when its definition is encountered and destroyed when its name goes out of scope. An automatic object is allocated each time its block is entered and exists only until the block is left. Objects with global names are created and initialized once and "live" until the program terminates. Using new and delete operators in C++ language, the program can create objects whose lifetime is controlled directly. It is often useful to create a new object, which can be used after returning from the function in which it was created.

Figure 2:
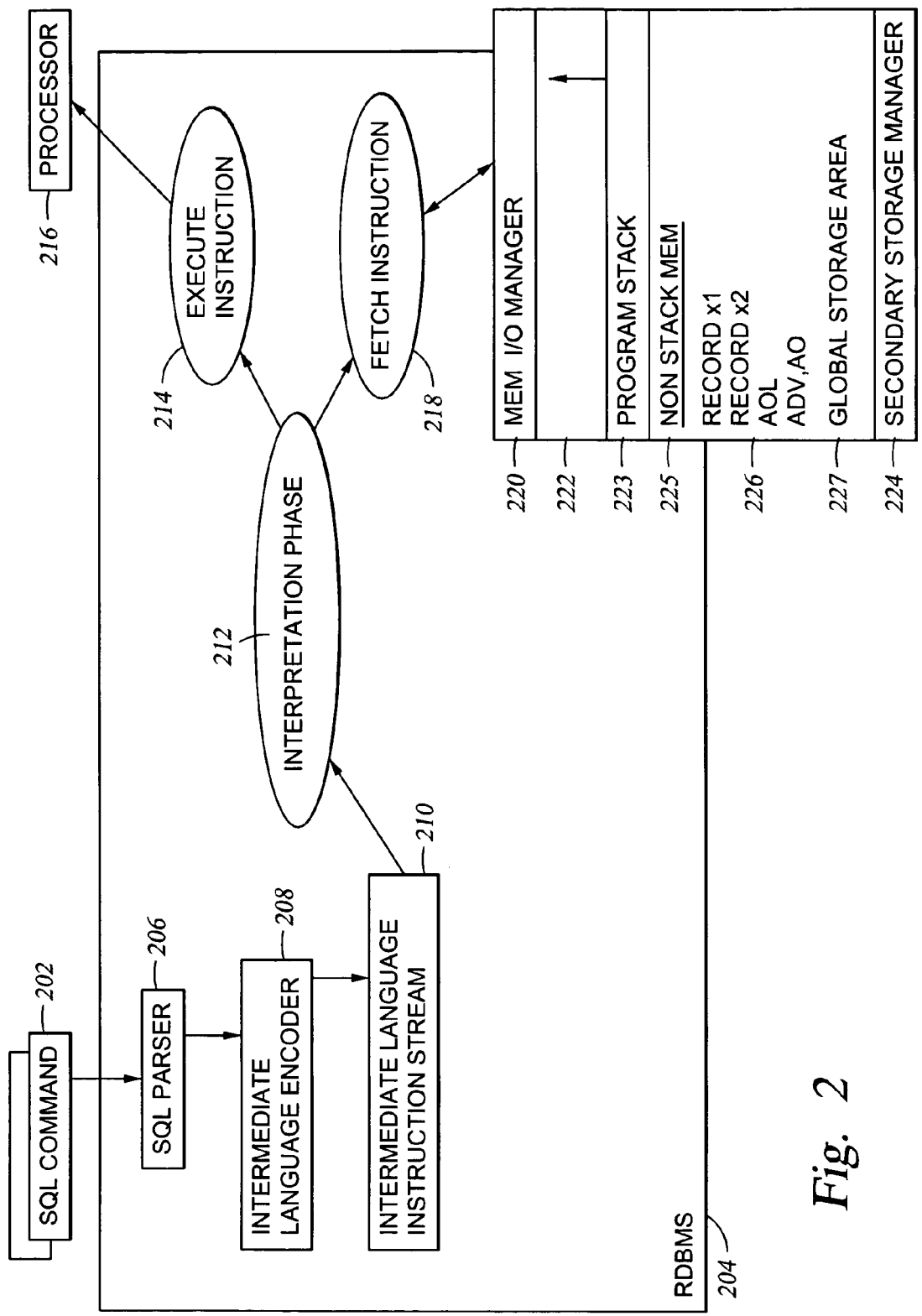
FIG. 2 is a high-level block diagram illustrating the software functions in accordance with an aspect of the present invention.

FIG. 2 is a block diagram illustrating a high-level software context in a typical interpretive embodiment. User commands enter the RDBMS 121 application in the form of SQL commands 202 or more generally queries. The SQL formatted commands are parsed individually 206 with a interpreter intermediate language encoder program 208, which generates an intermediate language instruction stream 210. The instruction stream must carry connective type instructions to open buffers, stack space, call functions, handle returns etc. An interpreter phase 212 then dispatches execution 214 instructions to the processor 216 or fetch instructions 218 to the memory manager 220. Some data records are cached in memory 222 and some are in secondary storage 224. Once the Intermediate Language Encoder 208 generates the instruction stream 210, much of the program logic is structured and the interpretation phase 212 setup to respond along prescribed paths.

One embodiment of the invention addresses data structures and software architecture, which organize the query into live objects and which act in concert to process the query. These structures generally reside in the computer system's addressable memory 222 and are covered in more detail below. Many different memory allocation and management schemes are known. Most addressable memory schemes include a call stack area 223 and a non-stack area 225. The stack space, stack area 223 in use, grows or shrinks as stack space is required by functions. Live objects 226 comprising instantiated data structures generally reside in memory 222 allocated in non-stack 225 space or dynamic memory when used. In one embodiment of the invention, certain live objects 226 perform the necessary processing with reduces use of the call stack 223, thereby greatly reducing the need for pushing and popping on and off the call stack 223. In addition, aspects of the present invention make the use of an evaluation stack unnecessary. An evaluation stack is conventionally used to perform expression evaluations. The use of an evaluation stack is made unnecessary by aspects of the invention by performing operations directly and passing execution directly to adjacent live objects 226. That is, comparison operations are performed by de-referencing associated attribute operands and loading the attribute operands into registers without an intermediate step of placing the operands into a structure (e.g., an evaluation stack) for further manipulation. A global status storage area 227 is used when anomalies are encountered when processing comparison operations. The global status storage area 227 can be implemented in a variety of forms as is well known to one skilled in the art. In a particular embodiment, the global status storage area 227 is implemented as a stack, referred to herein as a "status stack" or "global status stack". However, as will be described in more detail below, the global storage area 227 is only used in the event that an invalid operand of a comparison operation is encountered.

Aspects of the current invention restructure the internal workings of the RDBMS programs into objects which handle the incoming queries, breaking down the individual queries into their elemental attribute states and operating on these attributes directly. In an embodiment of the invention the intermediate results obtained from individual attribute operations are not immediately returned to the calling program but instead execution is passed on to adjacent objects in the operator assemblage which carry cumulative results of the attribute comparisons, logical operations, range tests, membership tests, pattern matches, etc. returning execution and control to higher level caller functions. As defined here, adjacent objects are nodes which are sequentially connected in execution or logic flow. Typically, the true and false outcome legs of a comparison object each lead to other operation objects, which are adjacent objects. Execution returns after mathematically or logically sufficient operations have been accomplished to determine the individual query or clause outcome.

Query Parsing and Interpreting the Subject Query

As described with respect to the query example above in the Background section, a query will frequently have at least several database fields and mathematical relationships or logical operations, which need to performed to yield the requested results. An aspect of the present invention is to instantiate live objects that perform the individual selection operations directly. That is, the mathematical or logical operators execute on their individual operand data field variables, and pass control to an adjacent object. Because these instruction objects operate on database fields (attributes), these operations are referred to herein as attribute operations, with the entire set of attribute operations required for a query referred to as an attribute operation list (AOL). To enable record selection and other SQL commands, these lists return a status indicating the outcome of the selection. Because each object performs its operation and then returns the result of its neighboring object, the call can be foliated (tail calls), also known as call threading. This means that execution control propagates from object to object and returns directly from the last object in the list to the original caller. Furthermore, where call foliation is used, any stack required by an operation may be collapsed prior to passing control to an adjacent object. This implementation is more efficient than passing control from object to object by pushing and popping on and off the program stack. However, it should be understood that embodiments of the invention need not be implemented using call foliation.

Attribute Descriptor Vectors (ADVs)

An aspect of the invention is its object oriented character and approach to query implementation. Strategically designed objects from carefully chosen primitives allow for the streamlining of processing algorithms which enable the more efficient process implementation shown above in an aspect of the invention. The Attribute Descriptor Vector data structure is one such object, which defines the fields needed for an entire query. Each attribute descriptor vector describes an attribute field, contains important information useful in its efficient processing and a reference to the field's location in memory. The attributes memory location (address) can be for user buffers, data space records, intermediate results buffers or some other memory storage or register location. An illustrative outline for the Attribute Description Vector (ADV) data structure is as follows:

Sample Attribute Descriptor Vector

```
{
    Index number
    data type
    typical allocation size
    Maximum allocation size
    Status
    Error Code
    Error Index
    Attribute Value Reference
}
```

Figure 3:
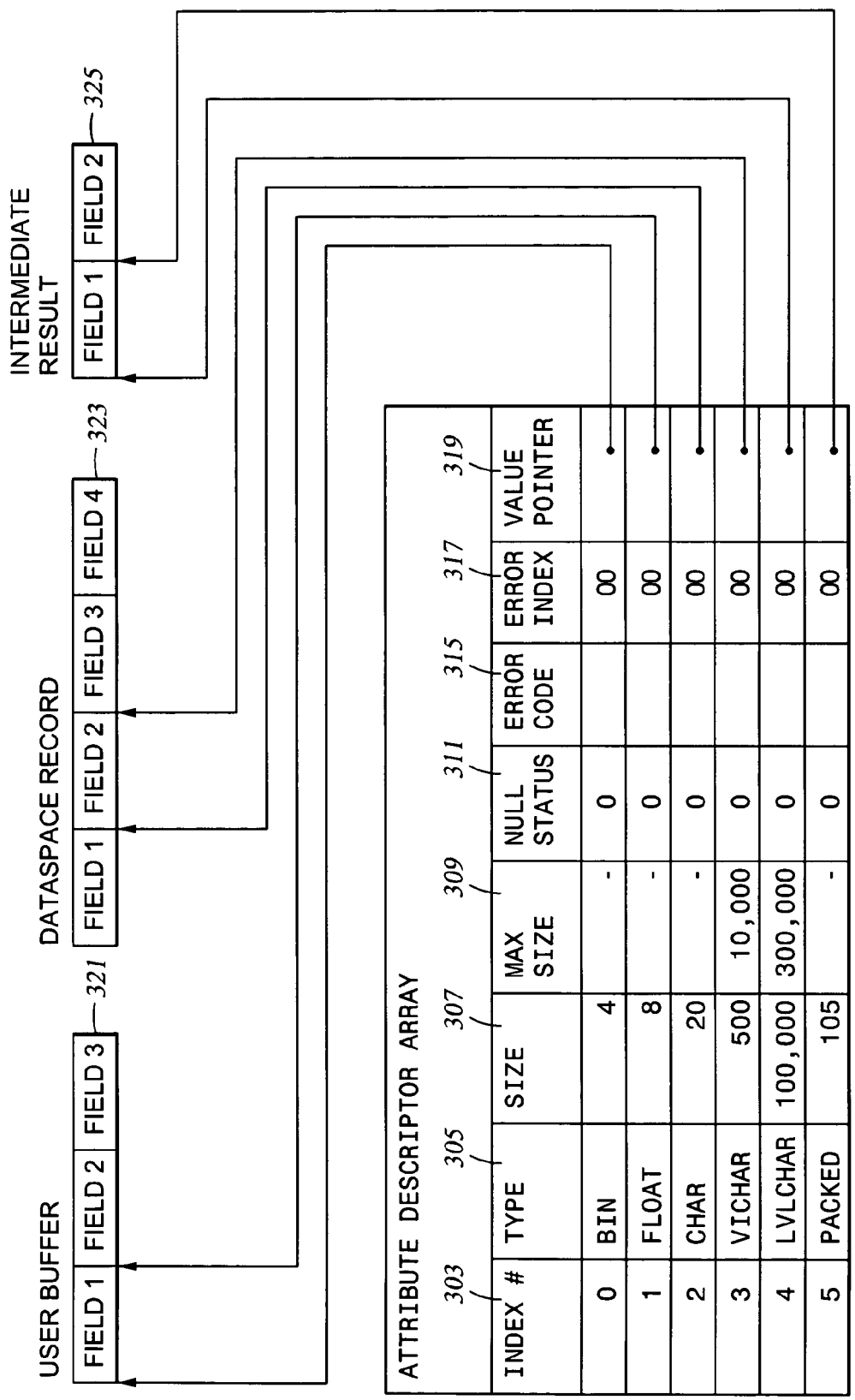
FIG. 3 illustrates an Attribute Descriptor Vector and examples in accordance with an aspect of the present invention.

An illustrative Attribute Description Vector 300 is shown in FIG. 3. The array of Attribute Descriptors 301 shows the data structure fields as table column headers Index# 303, Type 305, Size 307, Max Size 309, Status 311, Error Code 315, Error Index 317 and Attribute Value Reference 319. The Attribute Value Reference 319 contains pointers referencing associated attribute fields in User Buffer 321, Dataspace Record 323, and Intermediate Result 325 memory locations. The type field 305 specifies the amount of storage allocated to the variable, the set of general operations which can be performed on the variable, variable array dimensioning and packing and other functional limitations. The relationship between the type field 305 and the value pointer field 319 should not be strictly construed as one to one but based more on storage and programming considerations. For example, char attribute variables may be found in User Buffer 321 fields or in Dataspace Record 323 fields and would be referenced as stated above on variable scope, storage and programming logic considerations.

Attribute Operation Lists (AOL)

Figure 4:
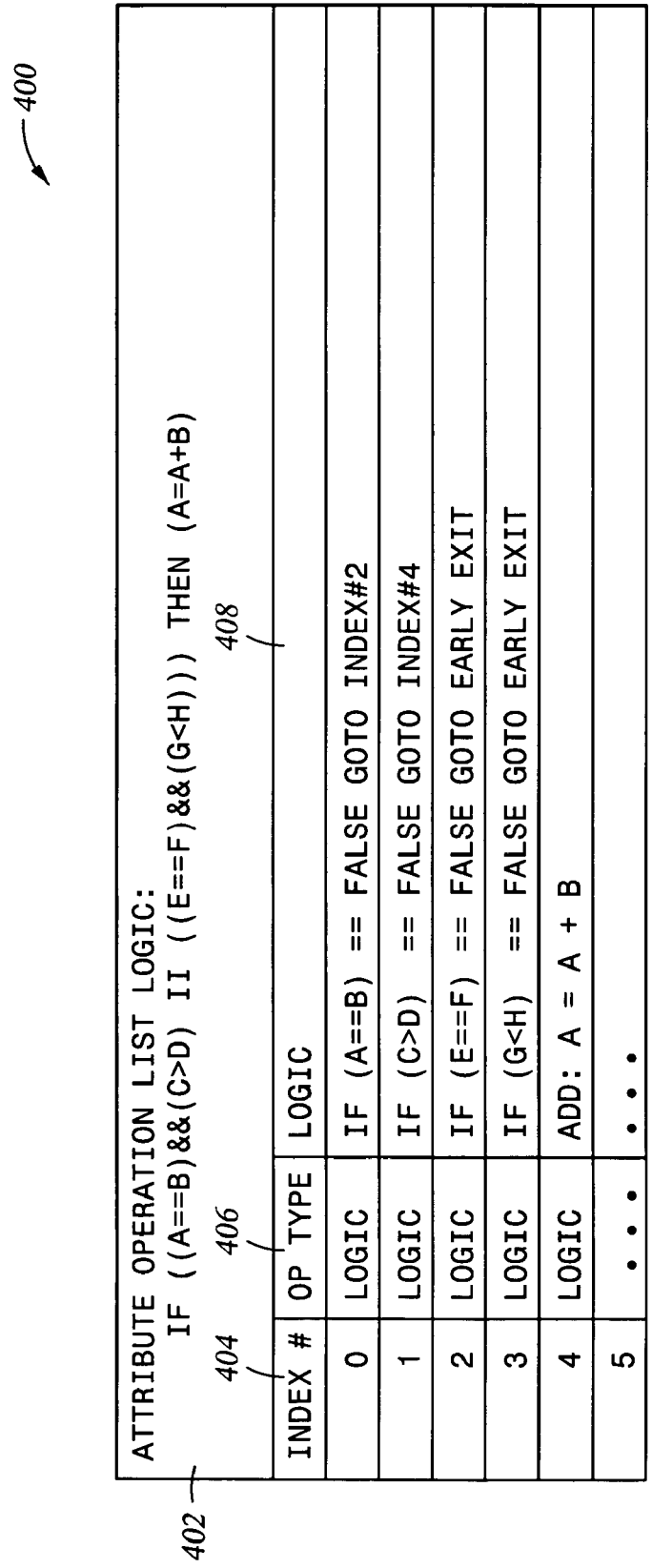
FIG. 4 illustrates Attribute Operation List and examples in accordance with an aspect of the present invention.

Yet another aspect of the invention is the operation on strategically defined objects of the object oriented approach used in this implementation. Objects in the form of Attribute Operations manipulate and/or compare attribute descriptors in the Attribute Descriptor Vector instantiated object. In one embodiment a logical object organization of attribute operations, comparison and mapping, forms the basis for an aspect of the invention data structures and are together referred to as an Attribute Operation List (AOL). An AOL contains all of the data manipulation and comparison logic needed to do one iteration of work. A statement requiring the evaluation of a clause with multiple field compares and/or mathematical operations on various field attributes are separated into lower level primitive operations. An example AOL 400 and it's component makeup are shown in FIG. 4. The Attribute Operation List 400 contains the query or clause 402 to be evaluated and an Index number column 404, an Operation Type column 406, and a Logic column 408, in which the Logic column 408 contains individual mathematical manipulation or logic to be done. Each row in the table represents one attribute operation which may or may not need to be executed depending on the thread of control dictated by the process implementation and rules of logic as implemented by aspects of the invention. Note that the individual operations 408 to be done are partitioned off of the query clause 402 roughly from left to right resulting in the individual operation types 406 to be ordered rows from top to bottom and also ordered according to Index number 404. Other schemes are possible and this is only one example.

In a typical query, attribute operation lists are often the largest unit of work in the query. These units of work can be abstracted into larger objects on higher abstraction layers which are used to perform higher level functions such as whole table inner joins, indexing operations, aggregation operations, and others. A communication protocol between these higher abstraction level objects is implemented using AOLs. Using instantiated attribute operation list data structures allows the entire query to be described and treated as tree structures. Tree structures offer many advantages and functionality in current processing and storage technologies.

Mode of Operation

Consider the following SQL statement the subject query:
SELECT a.f1 FROM table 1 WHERE (a.f1>1 AND a.f2=2) OR (a.f3/a.f4)<3.

The WHERE clause typically contains expressions to which solutions ultimately identify records sought by the SELECT statement. Operations on field variables within the WHERE clause can be generally categorized into two basic types of attribute operations: mapping and selection. Mapping operations perform attribute derivations by performing basic arithmetic calculations and storing the intermediate results into temporary buffers, e.g. temp=a.f2/a.f3, and then pass control directly to an adjacent object, typically an object containing the next attribute operation to be performed. These operations propagate the status of their operand attributes to the result attribute (temp in the previous example). Only if all operands are clean, i.e., not NULL or ERROR, is the specific operation actually executed. If the operation encounters an error or null during execution, e.g., divide by zero, overflow, etc., the result attribute is set accordingly.

Figure 5:
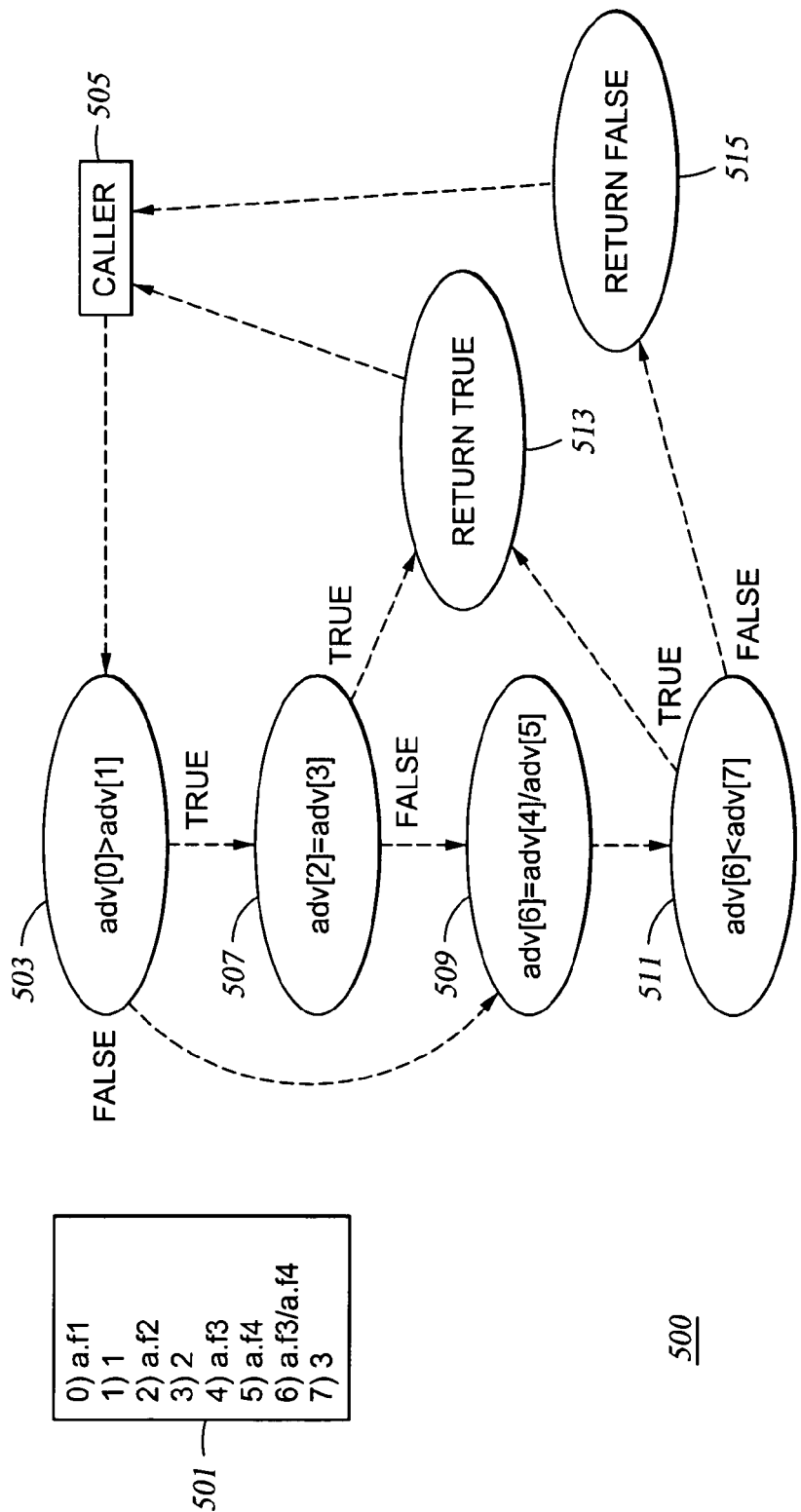
FIG. 5 is a graphical illustration of an Attribute Operation List implementing an example SQL command WHERE clause, in accordance with an aspect of the present invention.

Selection operations implement the necessary comparisons in the WHERE clause. FIG. 5 illustrates an exemplary AOL that implements the SQL WHERE clause of the SQL statement above. The illustrative WHERE clause is broken down and reorganized in accordance with an Attribute Descriptor Vector 501 (ADV) partially shown with attributes indexed from 0 to 7. The expression attributes and constants along with their salient characteristics are stored in the Attribute Descriptor Vector (ADV). The comparisons are operations, which are applied to consecutive array elements of the ADV 501. These operations with operands from the ADV array form the Attribute Operations List and are individually executed operations shown in FIG. 5 as nodes 503, 507, 509, and 511. The caller 505 object initiates the flow of execution which is terminated with cumulative results from nodes 513 or 505. The ADV 501 in this example is an array structure but could be any indexed or linked data structure, which is described in more detail below. The first two elements of the ADV 501 correspond to attributes which are processed in attribute operation object 503, the next two elements correspond to attributes processed in object 507 and so forth. SQL selection operations implement the necessary comparisons which constitute the basis of an attribute operation, e.g., a.f1>1 comparison in 503, and based on the outcome, branch to one of several adjacent objects (typically two). For the comparison operation at 503, the operation branches to 507 for True and 509 for False. The equivalence test operation a.f2=2 (adv[2]==adv[3]) is done at 507 with a True result passing control to 513 (return true) and a False result passing control to object 509 for the next attribute operation. From 509, control proceeds to 511 to perform the comparison a.f3/a.f4 (adv[6]<adv[7]). If 511 is answered True, control proceeds to 513 which returns True to the caller 505. Alternatively, if 511 is answered False, control proceeds to 515 which returns False to the caller 505. In this embodiment, call foliation, i.e., threading call execution from object to object, reduces the need to return and thereby eliminates all the overhead associated with a call return. The individual attribute operations which are accessed form an attribute operations list (AOL).

Figure 6:
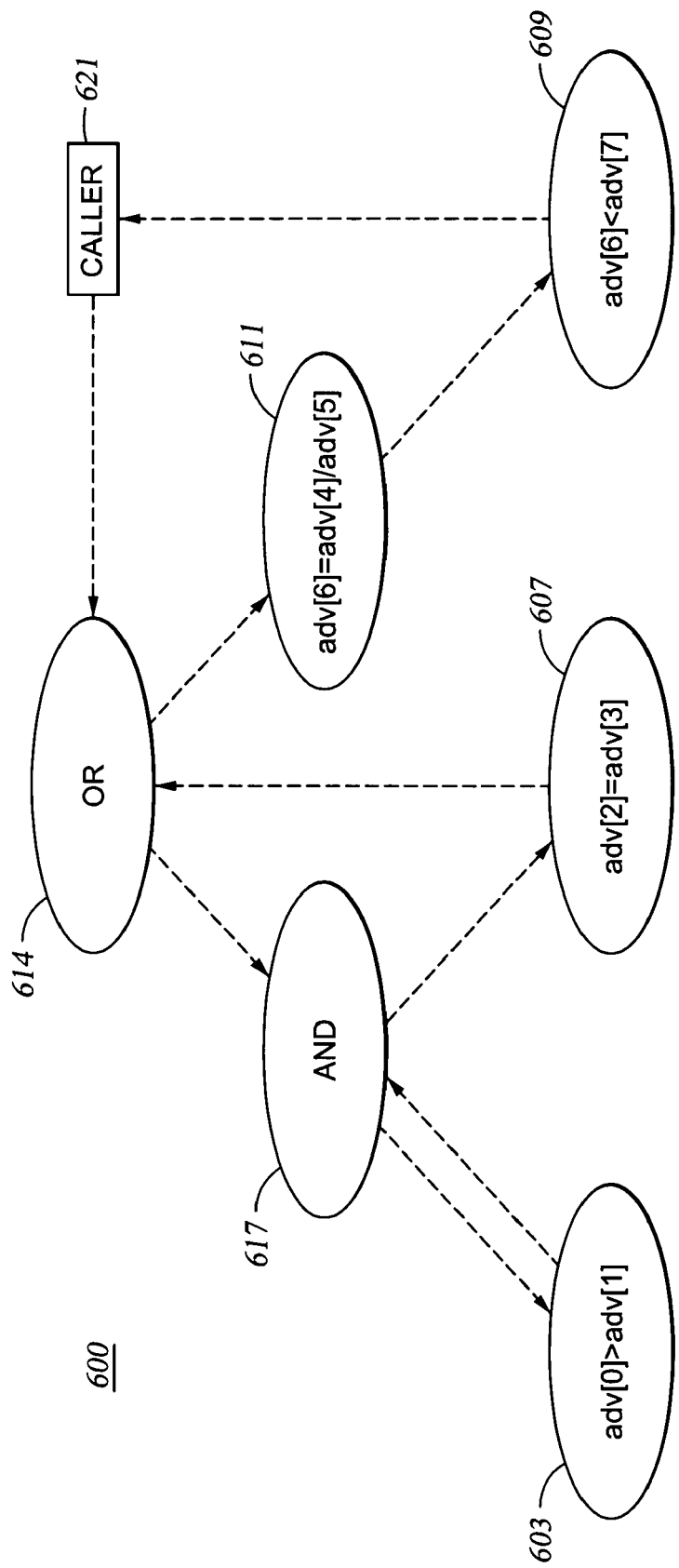
FIG. 6 is a graphical illustration of Attribute Operations with addition of comparison operations implemented into list terminators, in accordance with an aspect of the present invention.

Note that the completed AOL returns either true 513 or false 513. However, this must be expanded, as the comparison of database attributes must also include null and error statuses. One embodiment in this regard is illustrated in FIG. 6 and can be accomplished by implementing virtual logic operations like AND 617, OR 619, etc., and converting the comparison operations 603, 607, 611, 609 into list terminators. As in FIG. 3 above, the flow of execution is initiated at a higher level function by the caller object 621 which also receives the result after the last comparison attribute operation 609 is completed.

Furthermore, status is expanded to include all four values (true, false, null and error) instead of only the two (true, false). The additional values provide means for "cleaning" intermediate result statuses and procedurally mapping the null and error results intelligently to true/false status. However, as the FIG. 6 example illustrates, this implementation results in the elimination of most of the call foliation achieved in FIG. 5, and thus may be less desirable from the standpoint of performance. Nevertheless, attributes that are null or in error generally occur only a small percentage of the time and therefore efficient control flow can be achieved while still maintaining the capability of intelligently handling the exceptions when they arise.

Figure 7:
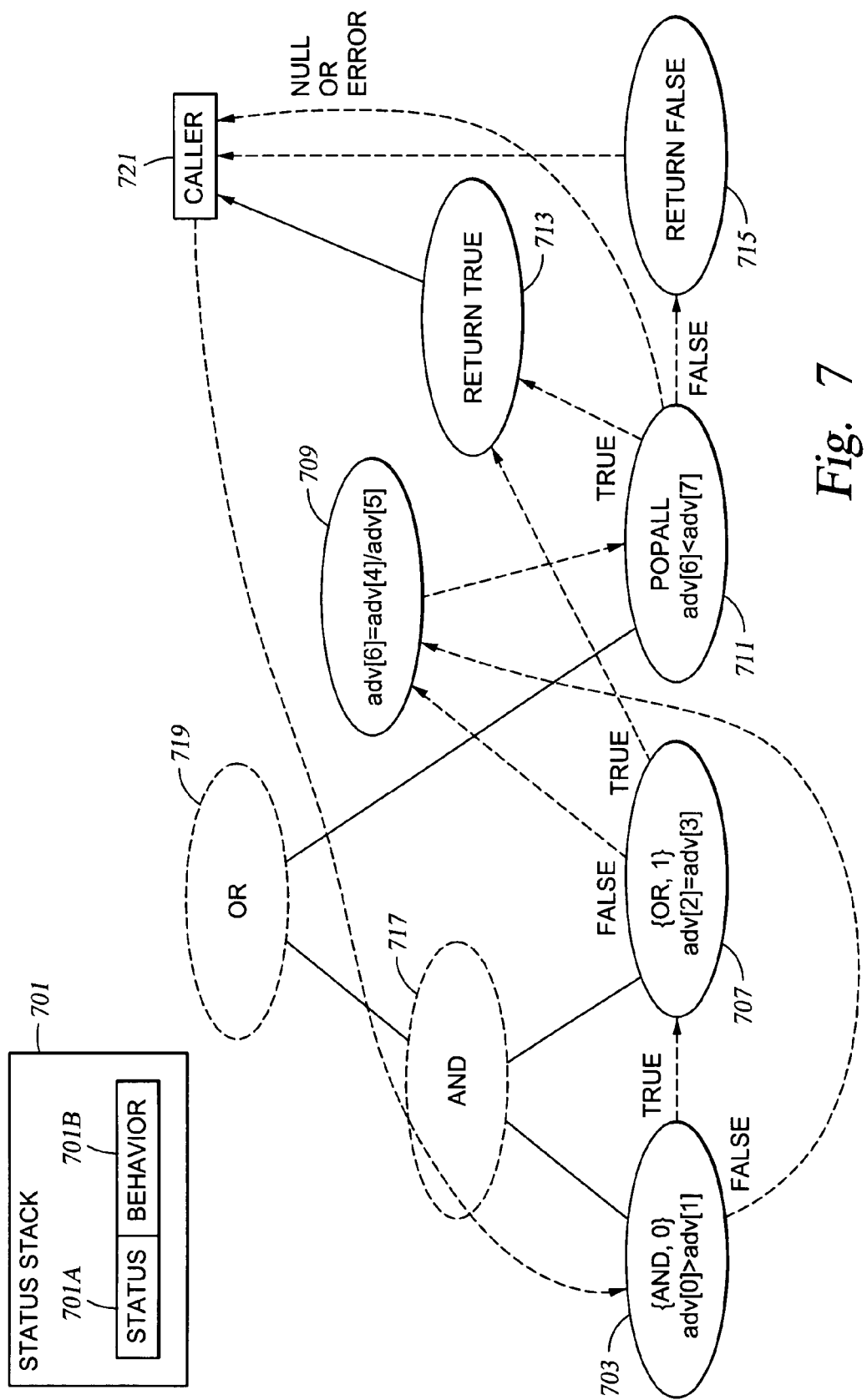
FIG. 7 is a graphical illustration of Attribute Operations with call foliation and reduced stack utilization, in accordance with an aspect of the present invention.

In another embodiment, the previously described AOL scheme in FIG. 5 and FIG. 6, which includes the virtual logic operations, are combined with a global storage area 227 (shown in FIG. 2). In the following embodiment, the global status storage area 227 is implemented as a global status stack structure (also referred to herein as a "status stack 701"). The status stack addition allows maximum foliation and reduced call stack utilization for a slight penalty when errors or nulls are encountered. FIG. 7 is a graphical illustration of Attribute Operations with call foliation and reduced call stack utilization, in accordance with such an aspect of the present invention. FIG. 7 is generally the superimposition of FIGS. 5 and 6. This approach requires the instantiation of a global status stack 701 object that each of the comparison attribute operation objects 703, 707, 711 can access. In addition each of the comparison attribute operations are configured with a behavior element in the stack 701, e.g., AND, OR, etc., as well as a limit to how many status elements can be popped and evaluated from the status stack 701 (referred to as poplimit). Each element of the status stack 701 is comprised of a status field 701a and the associated behavior field 701b. Each comparison attribute operation pushes and pops its status and behavior onto the status stack 701, which is global in scope to the attribute operations. In this embodiment, the global status stack 701 is not needed by the mapping operation 709 since the mapping operation result is passed directly to the next comparison operation 711. In the present embodiment, the global status stack 701 is needed only for the logical comparison operations when error or nulls are encountered, i.e., an error or null results from the comparison operation, which are needed to ascertain the logical operation states stored on the global status stack 701. In this fashion, error or null results on a branch which is non-determinative from the logical operation standpoint are superfluous and set aside allowing execution to continue.

As in FIG. 5 and FIG. 6, the dotted lines in FIG. 7 show thread call execution flow. Note that the three comparison attribute operations 703, 707, and 711 perform the attribute comparison operations and a mapping derivation is performed by the attribute operation object 709. Since the result of attribute comparison operation object 703 is ANDed with attribute comparison operation object 707, behavior of comparison attribute operation 703 is identified as a virtual logical operation and the value in the behavior field 701b of the status stack 701 is set to AND. However, since attribute comparison operation object 703 cannot apply a logic operation, i.e., it needs the result from attribute comparison operation object 707, its status stack 701 pop limit value is set to 0. At attribute comparison operation 707, the resulting status 701a (recorded in status stack 701) of object 703 AND 707 is ORed with that of attribute comparison operation object 711, so the behavior of attribute operation (AO) object 707 set in the behavior field 701b is set to OR. At AO object 707, the status from AO object 703 has been determined, so the poplimit of AO object 707 can be set to 1, indicating that the virtual logic operation stored in the behavior field 701b (of the status stack 701) for object 703 can be applied on comparison attribute operation objects 703 and 707. Finally, at the operation of AO object 711, no further behaviors from status stack 701 are required, so the behavior of AO object 711 in status stack 701 is not used. However, since AO object 711 represents the last comparison operation of the expression, its poplimit is set to a special value (popall) indicating that all stack statuses should be evaluated.

In general, the behavior (indicated in the behavior field 701b of the status stack 701) of a comparison operation representing the left operand of a virtual logic operation (717 and 719) is set to that operation. In the example, the behavior stored in the behavior field 701b for the AO comparison object 703 is AND, and for the AO comparison object 707 the behavior stored in the behavior field 701b is OR. The poplimit is set to the height of the sub-tree formed by the virtual logic operations 717 and 719 starting with the rightmost child of the comparison operation (in this case 711) and stopping on first leftmost child, in this case 703. The only special case is when the poplimit of the last comparison operation 711 is set to popall. At this point, the AOL result is then either true 713 or false 715 and returned to the caller 721 indicating the final result of the WHERE clause. Although infrequent, a popall occurs when the query execution flow encounters a null or error which was determinative in precluding valid logical processing, and execution is returned to the caller 721 from 711.

Accordingly, an aspect of the invention allows for encountering null or error conditions and purely accepting or purely rejecting these based on driving logic ramifications in order to complete the clause, rather than routinely returning the status to the caller function to be handled in a less than optimum way. Execution flow is directed to a true or false leg for further processing which will determine downstream if a comparison operation was logically necessary, or occurred on a non-determinant branch of a logical operator.

Further, aspects of the invention use a global status storage area 227 (such as status stack 701) to advantage. In general, the global status storage area 227 is generally used when anomalies are encountered and communication is required between comparison operations to facilitate execution flow determinative logic branches. The global storage area 227 can be implemented in a variety of forms as is well known to one skilled in the art and in an exemplary embodiment is implemented as a stack.

While some embodiments use a status stack for purposes of storing a behavior value and a status value, aspects of the invention reduce stack usage for purposes of evaluation. Conventionally, performing an attribute operation involves placing operands on an evaluation stack. Operands are copied from memory storage buffers onto such stacks for evaluation before loading to registers for the comparison. In contrast, embodiments of the present invention perform operations directly. Specifically, operands are dereferenced and loaded into registers without first placing the operands into an intermediate software structure (e.g., an evaluation stack). This can be accomplished because the comparison operations with error or null operands access the global status storage area 227 and store the results status there and need not actually attempt a comparison, since they would be invalid. Execution flow is directed to a true or false leg for further processing which will determine downstream if the comparison operation was logically necessary, or occurred on a non-determinant branch of a logical operator.

It will be obvious to one skilled in the art that certain modifications may be made to the data structures disclosed herein without departing from the spirit of the invention. For example, field labels may be changed and the order in which they are listed may be altered. The variables and arrays alternately may be referenced as pointers or address references. The logic in the example clauses can be substantially different for other queries producing vastly different fundamental logic operations and comparisons.

It must be emphasized that the above data structures are not merely for SQL RDBMS query applications but can be used in evaluation and processing of any clause composed of multiple fields and requiring multiple mathematical and logical sub-operations and manipulations on these fields. It is foreseeable that these can be adapted to various XML and SOAP applications, which would also benefit from the compact tree structure objects. The overall processing may be partitioned between clients and servers by using the data structures and implementation of the invention to better distribute the processing load and to handle error/null conditions more intelligently. These objects may be cached or transferred to files as well as databases using many known methods.

Flow Charts for a Generic Binary Comparison Operation

Figure 8:
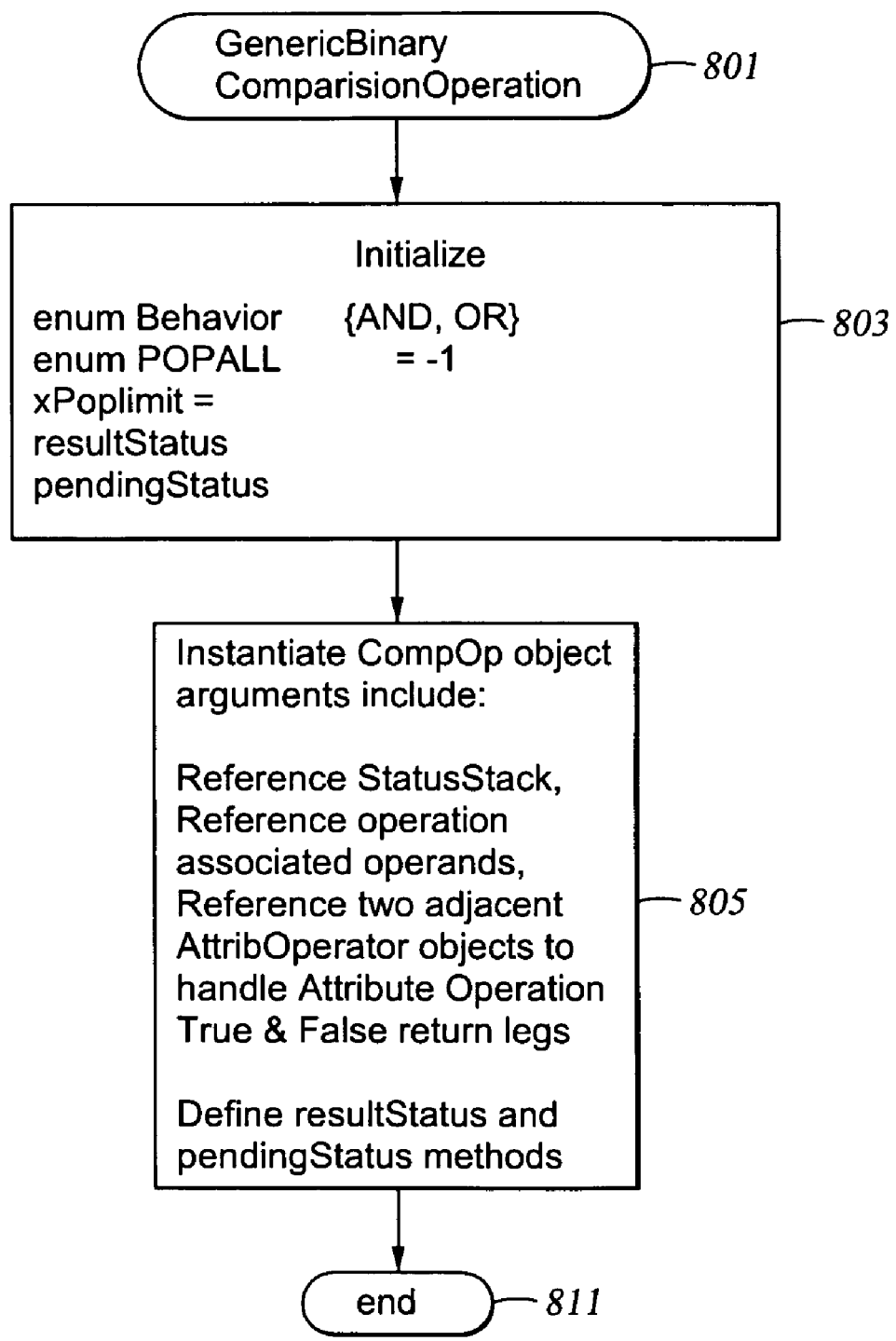
FIG. 8 is a program flow chart of the comparison object, in accordance with an aspect of the present invention.
Figure 9:
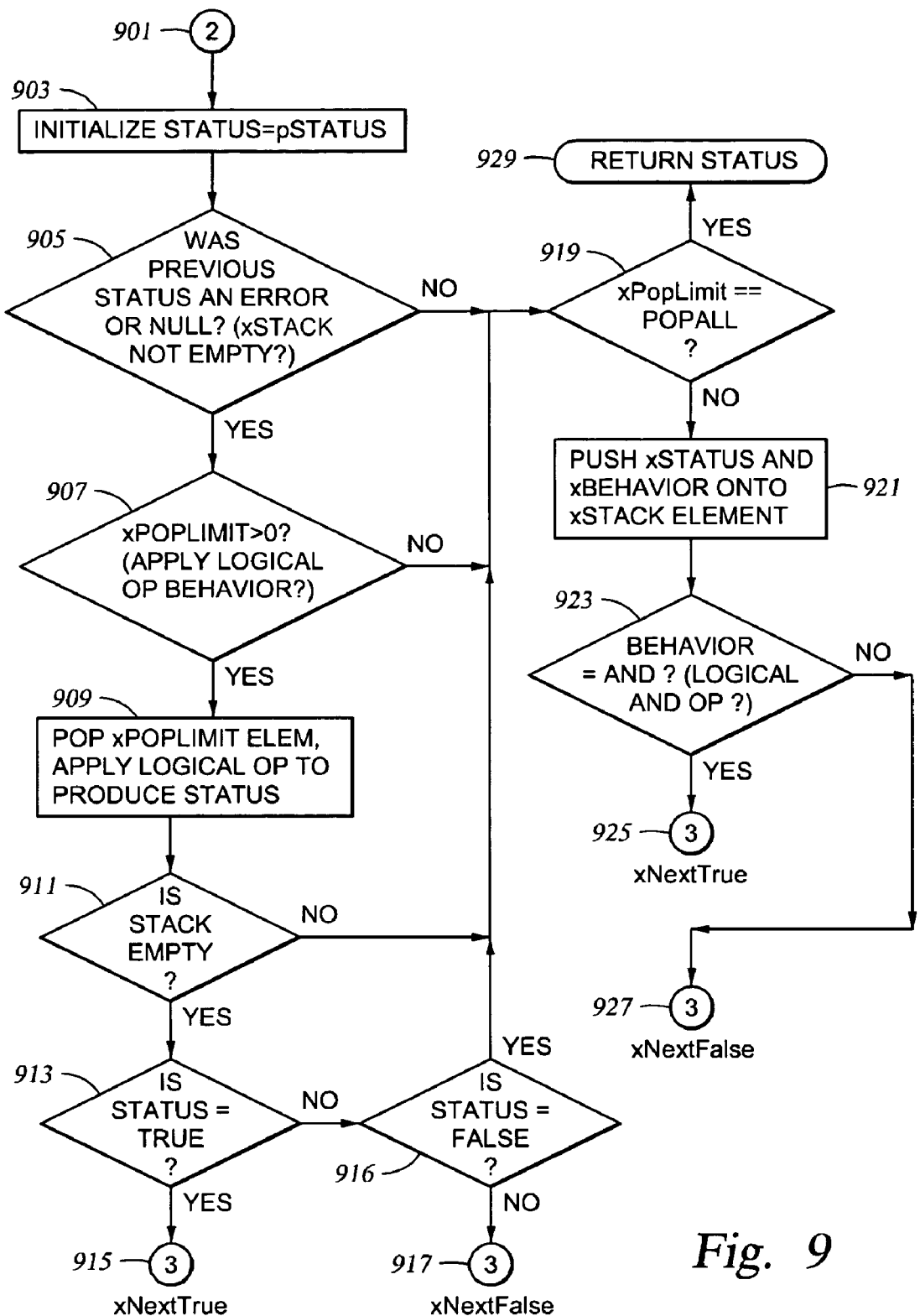
FIG. 9 is a flow chart diagram illustrating the results status method in accordance with an aspect of the present invention.
Figure 10:
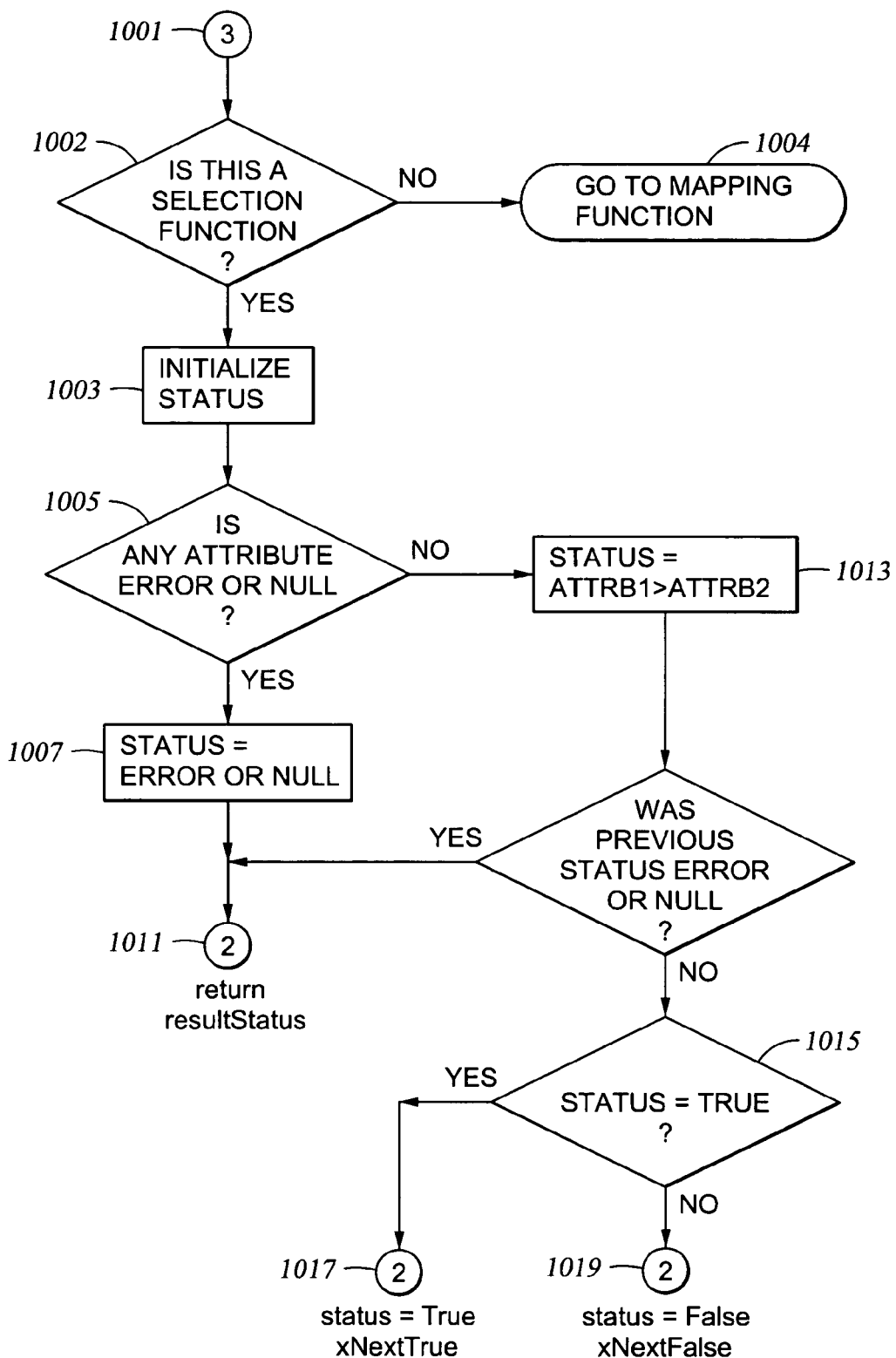
FIG. 10 is a flow chart of the Attribute Comparison Operator execution method, in accordance with an aspect of the present invention.

FIGS. 8-10 are flow charts, which describe an illustrative cycle of operation implemented for the solution of a typical query. Appendix A includes pseudo code for a Generic Binary Comparison Operation, which forms the basis for the flow chart illustrations in FIG. 8, FIG. 9 and FIG. 10. The preferred embodiment cycle of operation illustrated above in FIG. 7 is for the example WHERE clause query but can be expanded advantageously to other queries as will be readily apparent to those skilled in the art. Thus, while the examples in FIG. 3, FIG. 6, and FIG. 7 were specific for the associated query clause, FIGS. 8, 9, and 10 depict a more general implementation of aspects of the invention in which the set of true, false, error and null statuses are mapped to true and false statuses where advantageous and without any material loss to the query, i.e., where encountered nulls and errors are not query execution determinative.

Referring first to the flow chart of FIG. 8, the implementation of a generic binary comparison object is shown. The implementation in FIG. 8 begins by instantiating a binary comparison class object which includes some internal data structures for result status stack operation, two attribute operation objects for further execution legs, and two methods, resultStatus( ) and pendingStatus( ), described below. In one embodiment, objects, variables and data structures instantiated in this generic binary comparison object have an "x" prepended to the name label signifying that it is an internal instantiated data structure, variable or object and within the scope of the binary comparison object. The code portions included in FIG. 8, though not comprehensive binary comparison objects, serve to illustrate only aspects of the invention and without the added confusion of complete objects in a specific computer language. Step 801 begins execution of a comparison operation object. The comparison operation object initializes 803 variables used: POPALL, xPoplimit, xBehavior, xStatus, xNextTrue, xNextFalse and a status stack xStack. These variables and data structures are used in the illustrative execution. Following initialization, the comparison object is instantiated 805. Instantiation 805 creates a live object and includes execution of constructors to instantiate the object, creating references to the global status stack and to two Attribute operation objects, for the True and False legs for continuing execution. Two methods, resultStatus( ) and pendingStatus( ) are declared as well. Once instantiated, the comparison object will run resultStatus and pendingStatus methods, which are described in more detail in FIG. 9 and FIG. 10, respectively. The comparison operator is a binary operator and is only one of several operators which may be used. Unary, ternary and terminator operators may be employed as well but are not shown. The comparison operator is called by software above as per design and in concert with other operators with associated operands as needed for a particular query.

FIG. 9 is a flow chart diagram illustrating one embodiment of the resultStatus method declared at instantiation of the comparison operator in FIG. 8, in accordance with an aspect of the present invention. Nodes 905, 907, 911, 913, 919, 921 and 923 are all decision points which channel the flow of execution. Nodes 903, 909 and 921 manipulate variables. Nodes 915, 917, 925, 927, and 929 return execution control or branch to another method. The resultStatus method begins at 901 with initialization of its own local status 903 variable with pStatus. Execution flow then encounters a decision 905 for the previous error or null stack status. If the decision 905 is answered True, the control execution branches to a decision 907 to determine whether the poplimit is greater than zero. If the decision 905 is answered False, the control execution branches to a decision 919 for determining whether all statuses should be evaluated because the poplimit is set to the special value POPALL. The behavior operation decision 907 leads to the popping and evaluation of xPoplimit elements from the status stack. The execution continues to 911 to determine whether the status stack is empty. If the stack is empty, execution branches to a status check 913 to determine whether the status set at step 909 is True. If the status is True, execution threads to the True leg 915, whereby processing continues to the next attribute operation. If the status is not True, execution threads to test 916 to determine whether the status is False. If the status is False, then execution threads to the False leg 917, whereby processing continues to the next attribute operation. If the pending status is neither True nor False, then execution threads to decision 919. If the status stack test 911 determines that the stack is not empty, the execution must decide 919 if the pop limit is equal to POPALL. On True, status is returned 929, as is execution control. A false indication will branch execution to step 921 where the xStatus and xBehavior variables are pushed onto the status xStack. From thence, execution proceeds to the decision 923 where a determination is made as to which logical operator behavior to apply. True will branch execution to the next true leg xNextTrue 925 and a false will branch execution to the next false leg xNextFalse 927 of attribute comparison execution. Embodiments of both the true leg 925 and the false leg 927 are described in FIG. 10.

FIG. 10 is a flow chart of the Attribute Comparison Operator execution method 1000, in accordance with an aspect of the present invention. As described above, two attribute comparison operation object references were instantiated in the comparison operation object of FIG. 8, one for the True branch and one for the False branch of attribute comparison execution. In addition, two previously instantiated attribute descriptors are referenced which will allow processing to access each attribute operation operand having values of error or null. At step 1002, a decision 1002 to run the method 1000 is made. In one aspect, step 1002 is performed outside the scope of method 1000 but is included for here for completeness. Further, the outcome of step 1002 depends on the type of operation to be entered. If the operator is a selection type operation, then the execution thread continues to 1003. If the operation is a mapping type, this method 1000 is not used (indicated by block 1004). As mentioned above, in actual implementation, execution of this method 1000 would not occur unless the decision 1002 is made in the affirmative beforehand. In one embodiment, the mapping operation decision is made before runtime.

Execution starts with instantiation of a local status variable 1003 and two attribute descriptor references, one for each of two operands. Both operands are checked at step 1005 for error or null status. If the statuses of the operands are not error or null, the status is set 1013 to the result of the comparison of the two attributes accordingly, and execution branches to a check 1014 for previous error or null status (i.e., a determination is made as to whether the status stack is empty). A true at the check 1014 means that there was a previous error or null in which case execution returns a resultStatus 1011. If no previous error or null were encountered, processing will branch to step 1015 for a true or false status check. If the status is true, execution branches to a true status 1017 on the next true branch attribute operation execution. If the status is false, execution proceeds to a false status 1019 on the false branch attribute operation execution. If any attribute values 1005 were error or null, then the two attribute descriptors instantiated above are de-referenced and OR'ed to determine whether attribute is error or null and status is set 1007 accordingly. From there, the result status (null or error) and execution is returned to the comparison operator resultStatus method 1011.

The operation ADV array elements are operand data structures used in this implementation at step 1007 where they are checked for status before comparison or Boolean logic operations are applied. These ADV array reference operands are instantiated in 1003 before-hand. The Attribute Operation reference objects allow the execution to continue through the AOL by allowing each Attribute Operation object to channel execution through to its immediate neighbors xNextTrue and xNextFalse. Thus, execution progresses through the attribute comparison operations as true, false, error and null statuses are encountered, and is continued through the entire AOL without returning execution until successful completion.

Continuing forward with execution in the event of nulls or errors is another aspect of the current invention. Furthermore, as is illustrated above, maximal call foliation or call threading is possible even on encountering a null or error. However, as stated earlier, null and error processing is slightly more expensive due to the outline call and use of the status stack. Note however, that after pushing a status onto the status stack, the resultStatus( ) method drives to the true leg for AND behavior, and the false leg for OR behavior. This illustrates an aspect of the invention which in this implementation is demonstrated when encountering an AND or OR logic in the execution path. Upon encountering an AND, this implementation will attempt to convert null or error statuses into a pure false leg threads, i.e., "any status" AND FALSE is FALSE. Likewise, when encountering an OR, the implementation will attempt to convert the null or error statuses into a pure true leg threads, i.e., "any status" OR TRUE is TRUE. "Any status" means that logic leg is non-determinative and regardless of its value, the logic operator will yield a true or false depending on the determinant leg. This can also be understood from the logic AND and OR truth tables shown below. In this manner, some embodiments of the invention provide performance advantages over the prior art. The conventional method for handling true, false, error and null result is to continue logic execution with true and false, but interrupting, i.e. returning, on receiving error or null. Such an approach is wasteful because query processing is prematurely interrupted and control flow is returned to the caller for some cases where the returned null or errors were not governing and should have been disregarded. Moreover, a series of queries may be interrupted because the returned query may have invalidated the whole series or disrupted processing of all target records. This can be frustrating for users not concerned with whether an attribute field was anomalous (causes divide by zero or some other hardware fault) or a non-existent (NULL) value where the error or null status was not logically material to the query. Much processing of previous queries may have been spent, only to be undone because a small attribute causing error propagated up the return call chain and emerged as a large invalid query. By treating states true, false, null, and error as intermediate multi-state operator input states and taking advantage of the non-outcome determinative input-output logic operator properties to structure execution flow to circumvent non-determinative branches, an aspect of the invention yields intermediate results which map to true and false. Rendering the null and error intermediate results on non-outcome determinative logic operator execution branches inert prevents pre-maturely engaging the error handling routines resulting in unproductive, inefficient and resource wasteful query error recovery processing. Query processing continues because information that is process affecting but not logically necessary is addressed before that information can affect the processing. In essence, on encountering null and error intermediate Boolean operator state results on the non-outcome determinative input-output logic operator properties, an aspect of the invention prunes out those execution branches rendering them ineffective in producing query results.

In one embodiment, enhanced performance can be achieved by updating the generic Binary Comparison Operation::execute( ) method (illustrated in FIG. 10) signature with a Boolean pendingStatus parameter. This parameter is normally set to FALSE, e.g., empty status stack. But while the stack is non-empty, the parameter is set to TRUE. This avoids the constant loading and checking of stack state (scalar value parameters are assigned to registers by most compilers). Furthermore, if the status values are assigned as follows: true=7, null=3, error=1 and false=0, then the proper truth tables can be implemented by merely applying a bit-wise OR for OR behavior and bit-wise AND for AND behavior. The following tables, TABLE I for AND and TABLE II f

TABLE I

| AND | TRUE('111'b) | FALSE('000'b) | NULL('011'b) | ERROR('001') |
|---|---|---|---|---|
| TRUE('111'b) | TRUE('111'b) | FALSE('000'b) | NULL('011'b) | ERROR('001') |
| FALSE('000'b) | FALSE('000'b) | FALSE('000'b) | FALSE('000'b) | FALSE('000'b) |
| NULL('011'b) | NULL('011'b) | FALSE('000'b) | NULL('011'b) | ERROR('001') |
| ERROR('001') | ERROR('001') | FALSE('000'b) | ERROR('001') | ERROR('001') |

TABLE II

| OR | TRUE('111'b) | FALSE('000'b) | NULL('011'b) | ERROR('001') |
|---|---|---|---|---|
| TRUE('111'b) | TRUE('111'b) | TRUE('111'b) | TRUE('111'b) | TRUE('111'b) |
| FALSE('000'b) | TRUE('111'b) | FALSE('000'b) | NULL('011'b) | ERROR('001') |
| NULL('011'b) | TRUE('111'b) | NULL('011'b) | NULL('011'b) | NULL('011'b) |
| ERROR('001') | TRUE('111'b) | ERROR('001') | NULL('011'b) | ERROR('001') |

Taken together, data structures described and implemented with the above optimizations result in a lower number of machine instructions, less machine cycles, lower holdings in registers, less loading and popping stack variables, reduced path length and smaller working set size than would be typically used in evaluating the same query or clause by conventional methods.

While the foregoing is directed to embodiments of the present invention, other and further embodiments of the invention may be devised without departing from the basic scope thereof, and the scope thereof is determined by the claims that follow.

APPENDIX

```
enum Status {true,false,null,error} ;
Class ComparisionOperation : AttributeOperation {
protected:
    enum Behavior {AND,OR} ;
    enum {POPALL=-1};
    ComparisionOperation{. . .} ;
    Status resultStatus ( ) ;
    Boolean pendingStatus( ) {return !xStack.empty( ) } ;
private:
    const uint64   xPopLimit;
    Behavior   xBehavior;
```

APPENDIX-continued

```
    struct Element {
        Status          xStatus;
        Behavior        xBehavior;
    { ;
    Stack<Element>       xStack;
    AttributeOperation   &xNextTrue, &xNextFalse;
};
Status ComparisionOperation::resultStatus(Status pStatus) {
    Status status=pStatus;
    // Previous error or null encountered?
    If(pendingStatus( )) {
        // Can we apply behavior?
        If(xPopLimit) {
            // Pop xPopLimit elements, applying behavior to
produce status
            // Did we empty the stack?
            If(!pendingStatus( )) {
                If(status==true)
                    return xNextTrue.execute( );
                else if (status==false)
                    return xNextFalse.execute( );
            }
        }
    }
    if(xPopLimit==POPALL)
        return status;
    else {
        xStack.push(Element(status,xBehavior));
        returnxBehavior==AND? XNextTrue.execute( );
        xNextFalse.execute( );
    }
}
Class GenericBinaryComparisionOperation : public
ComparisionOperation {
public:
    GenericBinaryComparisionOperation(. . .);
    Status execute( );
private:
    AttributeDescriptor &xOperand1, &xOperand2;
};
Status GenericBinaryComparisionOperation::execute( ) {
    Status status;
    if(xOperand1.inErrorOrNull( )!! xOperand2.inErrorOrNull( ))
        status= ((xOperand1.inError( ) !! xOperand2.inError( ))
: error: null);
    else {
        status=xOperand1 > xOperand2; // Only true and false
are possible here
        // No previous error or null encountered?
        if (!pendingStatus( ))
            return status==true: xNextTrue.execute( );
        xNextFalse.execute( );
    )
    return resultStatus(status);
}
```

What is claimed is:

1. A computer-implemented method of processing a multi-state attribute field query, comprising:

a) structuring operator result states from a group comprising true, false, null, and error as intermediate multi-state operator input state results; and b) using non-outcome determinative input-output logic operator properties to structure execution flow circumventing unproductive branches and yielding intermediate results from the group of true and false;

whereby the null and error intermediate multi-state operator results on the non-outcome determinative logic operator branches are pruned out rendering them ineffective in producing query results;

storing the intermediate results from attribute operations in a global status storage area and manipulating the global status storage area in the process of propagating execution flow; and maintaining a logic operator value and operation object sub-tree height count in the global status storage area accessible by adjacent comparison operation objects when an operand of a comparison operation is null or error.

2. The computer-implemented method of claim 1, further comprising executing a plurality of instruction objects configured to perform attribute operations on associated attribute operands without the use of an intermediate evaluation stack by de-referencing and loading the associated attribute operands into registers for comparison operations.

3. The computer-implemented method of claim 1, further comprising allocating fields required by the query for a characteristic of an attribute and containing reference to a corresponding field attribute value.

4. The computer-implemented method of claim 1, further comprising instantiating an attribute descriptor vector data structure which comprises a set of individual attribute descriptor vectors required for the query.

5. The computer-implemented method of claim 4, further comprising instantiating a plurality of attribute operations on attribute fields defined by the attribute descriptor vector data structure.

6. The computer-implemented method of claim 1, further comprising accessing intermediate attribute operations on corresponding attributes by call foliation.

7. The computer-implemented method of claim 1, wherein the query is a structure query language (SQL) query.

8. The computer-implemented method of claim 1, further comprising accessing a global status stack only after a null or error status is encountered, the global status stack comprising:

a status field configured to hold values selected from a group comprising true, false, null and error; and a behavior field configured to hold a logic operator.

9. A computer readable storage medium containing a program which, when executed, performs an operation for processing a multi-state attribute field query, the operation comprising:

a) structuring operator result states from a group comprising true, false, null, and error as intermediate multi-state operator input state results; and b) using non-outcome determinative input-output logic operator properties to structure execution flow circumventing unproductive branches and yielding intermediate results from the group of true and false;

whereby the null and error intermediate multi-state operator results on the non-outcome determinative logic operator branches are pruned out rendering them ineffective in producing query results;

storing the intermediate results from attribute operations in a global status storage area and manipulating the global status storage area in the process of propagating execution flow; and maintaining a logic operator value and operation object sub-tree height count in the global status storage area accessible by adjacent comparison operation objects when an operand of a comparison operation is null or error.

10. The computer-readable storage medium of claim 9, further comprising executing a plurality of instruction objects configured to perform attribute operations on associated attribute operands without the use of an intermediate evaluation stack by de-referencing and loading the associated attribute operands into registers for comparison operations.

11. The computer-readable storage medium of claim 9, further comprising allocating fields required by the query for a characteristic of an attribute and containing reference to a corresponding field attribute value.

12. The computer-readable storage medium of claim 9, further comprising accessing intermediate attribute operations on corresponding attributes by call foliation.

13. The computer-readable storage medium of claim 9, wherein the query is a structure query language (SQL) query.

14. The computer-readable storage medium of claim 9, further comprising accessing a global status stack data structure only after a null or error status is encountered, the global status stack comprising:

a status field configured to hold values selected from a group comprising true, false, null and error; and a behavior field configured to hold a logic operator.

15. The computer-readable storage medium of claim 9, further comprising instantiating an attribute descriptor vector data structure which comprises a set of individual attribute descriptor vectors required for the query.

16. The computer-readable storage medium of claim 15, further comprising instantiating a plurality of attribute operations on attribute fields defined by the attribute descriptor vector data structure.

* * * * *